United States Patent
Walker

[15] 3,697,012
[45] Oct. 10, 1972

[54] FLY REEL

[72] Inventor: Archie L. Walker, 754 Winter Avenue, Uniondale, N.Y. 11553

[22] Filed: July 9, 1970

[21] Appl. No.: 53,560

[52] U.S. Cl. ..........................................242/84.51 R
[51] Int. Cl. ..............................................A01k 89/02
[58] Field of Search ..242/84.5 R, 84.51 R, 214, 215, 242/216, 217, 218, 211, 212

[56] References Cited

UNITED STATES PATENTS

| | | | |
|---|---|---|---|
| 3,510,083 | 5/1970 | Cook | 242/84.51 R |
| 2,648,506 | 8/1953 | Kirby | 242/218 |
| 3,184,179 | 5/1965 | Wood, Jr. | 242/212 |
| 2,977,064 | 3/1961 | Logan, Jr. | 242/214 |
| 2,984,433 | 5/1961 | Clark | 242/84.5 R |

*Primary Examiner*—Billy S. Taylor
*Attorney*—Stanley J. Yavner

[57] ABSTRACT

A fly reel including a brake mechanism for controlling the reel action as the fly line unwinds from the reel. A novel ratchet arrangement for the reel is also described. Specifically, the fly reel brake mechanism includes deformable spring plates connected by brake posts, all attached on one end of the fly reel, such that the brake mechanism is removable as a unit for replacement or repair. A threaded cap is used to force a greater frictional engagement of the brake mechanism and thus to control the braking force during run-out of the fishing line. The ratchet engagement includes a large and a small ratchet wherein the large ratchet operates with relative motion between the ratchet and its pawl during the run-out operation and the small ratchet operates during the winding motion of the reel.

1 Claim, 4 Drawing Figures

PATENTED OCT 10 1972

ARCHIE L. WALKER

BY
Amster & Rothstein
ATTORNEYS

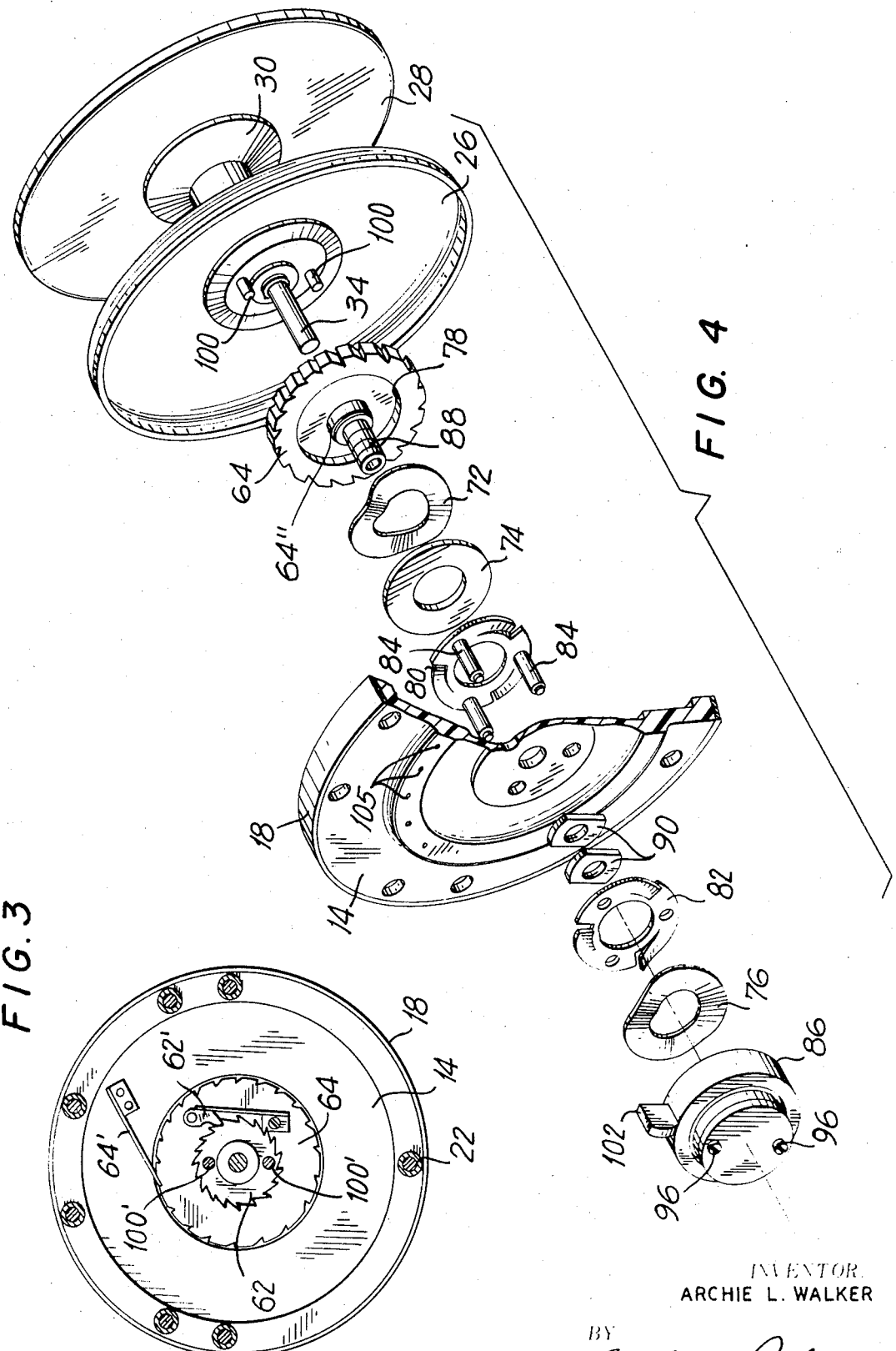

FLY REEL

This invention relates to a brake mechanism and more particularly to a disc brake mechanism useful in a fly reel for controlling reel unwinding.

It is common practice to provide means in a fishing reel or the like for controlling the action of the reel during operation. In most cases, the present designs include control means having a brake mechanism and many suffer from various disadvantages caused by the particular designs used. For instance, a single disc brake surface has been included on one side of the axis portion of the reel. The disc brake is usually mounted by a through bolt or other threaded member which extends through the axial portion of the reel. Disassembling such a brake mechanism involves the complete disassembly of the reel and, furthermore, such mechanisms have been found to provide less than perfect brake control for the reel. Various other brake mechanisms for fishing reels include rather complicated designs which also have proved to be undesirable in use.

Accordingly, a primary object of the present invention is to provide a fly reel of relatively inexpensive and simple, yet reliable construction.

A further and more particular object is to provide a fly reel brake mechanism that is easily accessible for replacement or repair. A still further object is to provide a fly reel brake mechanism in combination with a novel ratchet design including means for attaining substantially total control over reel winding and unwinding operations.

These and other objects of the present invention are accomplished in accordance with one illustrative embodiment of the present invention by a fly reel including a pair of opposed spring plates connected by a plurality of brake posts. The spring plates and posts are arranged on one side of the axis of a fly reel assembly such that the brake mechanism including the spring plates and posts is easily accessible for replacement or repair. Each spring plate is deformed to extend in places out of its own plane. A threaded cap houses one of the spring plates and is threadably attached to a ratchet bolt, the threading providing an adjustment mechanism for the braking assembly. As the cap is tightened, the spring plates are flattened and one plate is forced against a brake surface coplanar with a large or brake drum unwinding ratchet. A controlled braking force is thereby applied to the reel. The ratchet assembly for the reel further includes a small or retrieving ratchet for aiding the winding operation of the reel.

The above brief description as well as further objects, features and advantages of the present invention will be more fully appreciated by reference to the following detailed description of the preferred, but nonetheless illustrative embodiment when taken in conjunction with the accompanying drawings, wherein:

FIG. 3 is a sectional view of the reel mechanism of FIG. 2 and taken along the line 3—3 thereof to particularly illustrate the ratchet mechanism useful in a reel according to the present invention; and FIG. 4 is an exploded view of the reel and crank assembly of FIG. 2 showing particularly the various parts thereof.

Figure 1:
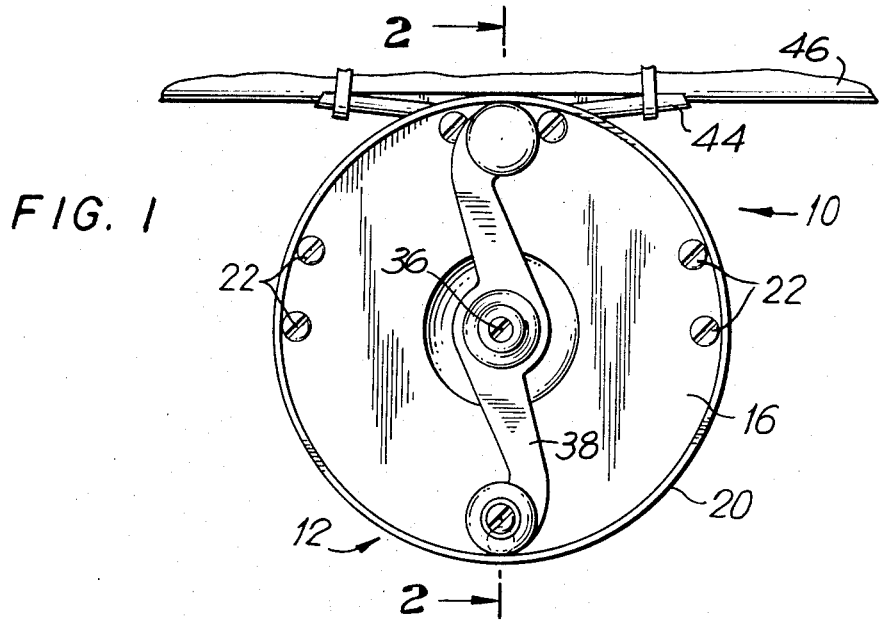
FIG. 1 is a side view of the reel and crank assembly showing also a partial view of the rod and its placement on the reel seat.
Figure 2:
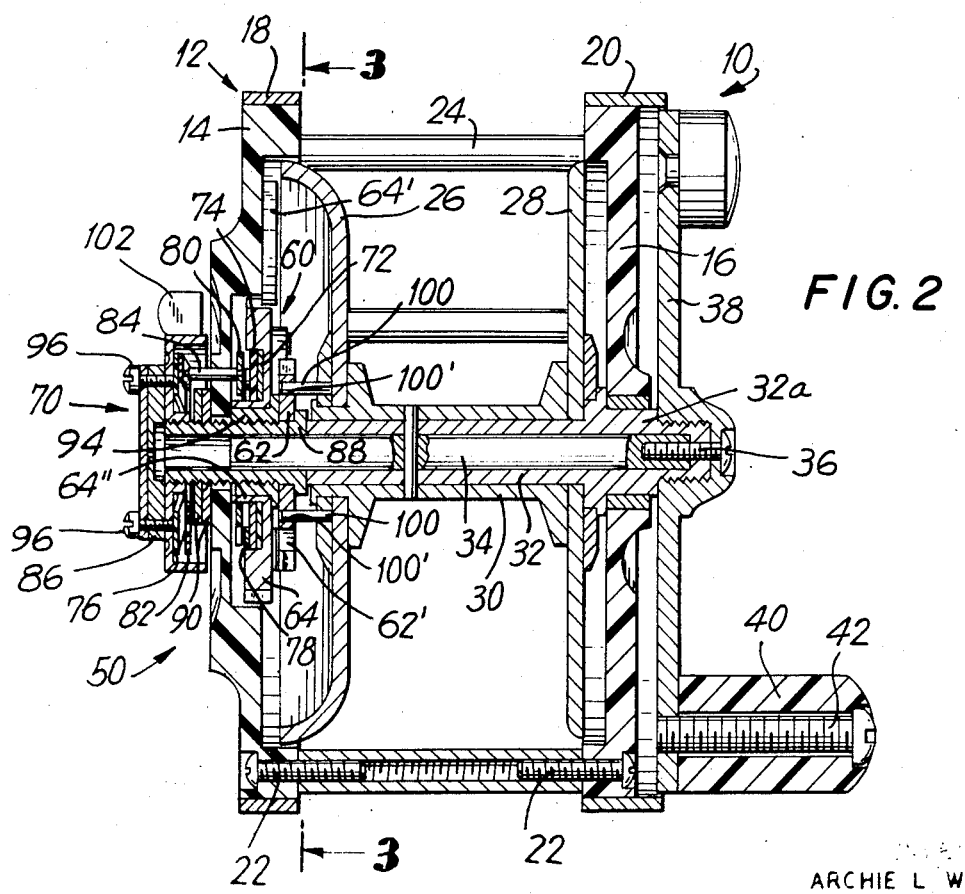
FIG. 2 is a cross sectional view of the reel and crank assembly taken along the line 2—2 of FIG. 1 and showing particularly the brake and brake adjustment unit for the reel.

Referring to the drawings and in particular to FIGS. 1 and 2, a fishing reel assembly, generally designated 10, is shown to include a reel housing 12 having first and second housing end plates 14, 16, peripherally surrounded by first end plate frame 18 and second end plate frame 20, respectively. The housing end plates are attached to each other at a location proximate their periphery by pillar fastening screws 22 and the spacing of the housing end plates is accomplished by means of pillars 24, through which the pillar fastening screws are inserted. On the inner sides of the housing end plates 14, 16 are affixed first and second line spool end plates 26, 28 respectively, with the line spool end plates being appropriately spaced by line spool spacer 30. The combination of line spool end plates 26, 28 and line spool spacer 30 accomplishes winding and support of the fishing line (not shown). The reel assembly further includes spool shaft 32 concentric to and within the line spool spacer 30. Also, concentric to the line spool spacer and located at the axis of the reel is a through shaft 34, which with through shaft end bolt 36 serves to retain crank 38 for winding and unwinding the fishing line manually. The crank 38 includes a crank handle 40, which is attached to the crank 38 by crank bolt 42 or the like. It may be seen that the spool shaft 32 functions as the front bearing of the assembly and particularly provides a bearing member 32a for the crank 38.

As is common in fishing reel assemblies presently marketed, a reel seat 44 is provided for attachment to the reel assembly 10 in order to support the rod 46.

The reel control assembly generally designated 50 is shown particularly in FIGS. 2 through 4 as including, according to the present invention, a ratchet mechanism 60 including a small retrieving ratchet 62 and a large brake drum ratchet 64. The retrieving ratchet 62 is controlled by a retrieving pawl 62' and the brake drum ratchet 64 is controlled by a brake drum pawl 64'. Appropriately, the retrieving ratchet 62 is useful when the fishing line is being wound onto the reel; for instance, while a fish is being pulled in by the fisherman using the reel assembly. On the other hand, the brake drum ratchet 64 is particularly useful during an unwinding operation, such as when the fish has been hooked but is being allowed to run with the line. Controlling the unwinding, for instance, while the fish is being allowed to run, functions to tire the fish and is therefore extremely critical to the fishing procedure.

Accordingly, the brake drum ratchet 64 is operatively connected to a brake assembly, generally designated 70, which includes first brake pad 72, second brake pad 74, and third brake pad 76. The first brake pad 72 is located within a brake drum ratchet cavity 78 defined by the brake drum ratchet 64. Also, the second brake pad 74 is located in the same cavity 78 for frictional engagement with the first pad 72.

Brake assembly 70 further includes first and second brake spring plates 80, 82 which are connected and spaced by brake posts 84. Each of the brake spring plates 80, 82 are deformed in places to extend out of their own planes. Such a construction allows further control of the reel assembly by use of the brake adjustment cap 86 which is attached to the unit by means of a threaded ratchet bolt and rear bearing 88. The ratchet bolt and rear bearing 88 further functions to retain the brake assembly 70 by its insertion through the hub 64 of the brake drum ratchet 64. The ratchet bolt and rear bearing 88 further passes through an opening defined by the first housing end plate 14, against whose surface it is retained by threaded ratchet nuts 90. Finally, the ratchet bolt and rear bearing is threaded to the brake adjustment cap 86, so that when the cap is turned in a clockwise direction, the brake spring plates 80, 82 tend to flatten and the first brake spring plate 80 bears against the brake pad 74 in a controlled manner. Stated in another way, the more the brake adjustment cap is tightened, the more braking friction will be provided between the brake pads 74, 72 to control and slow down the unwinding of the fishing line from the reel assembly as the fish runs.

Further features of the reel assembly include appropriate structures such as bushing 94 for threadable attachment to the ratchet bolt and rear bearing 88 within the hub 64 of the brake drum ratchet 64. Also, threaded fasteners 96 are provided to retain the various parts of the brake adjustment cap 86.

Disassembly of the reel and particularly the brake assembly thereof is facilitated by the structure as shown and described. For instance, if it were desired to repair or replace a part of the brake assembly 70 (or any other reel part), the pillar fastening screws 22 are unthreaded and the housing end plate 14 removed by lifting line spool posts 100 from mating bores 100. The brake adjustment cap 86 may then be completely unthreaded in a counter-clockwise direction from the ratchet bolt and rear bearing 88. As the cap is removed, the third brake pad 76 and the second brake spring plate 82 are removed with it, since those parts are housed within the internal cavity of the cap 86. The ratchet nuts 90 are then unthreaded from the ratchet bolt and rear bearing 88 thus facilitating a removal of the first housing end plate 14 from the assembly. The first brake spring plate 80 is attached by appropriate means to the brake posts 84 and this unit including both posts and spring plate are then lifted from the hub 64 and the cavity 78 of the brake drum ratchet 64. Located beneath the first spring plate 80 are the first and second brake pads 72, 74 and these brake pads are then easily removed from the cavity 78 of the brake drum ratchet 64. The ratchet unit 60 is then disassembled by lifting the retrieving ratchet, fixedly attached to the ratchet bolt and rear bearing 88, from the brake drum ratchet 64. Replacement and repair of the parts may then take place and the various parts reassembled for further operation.

In order to facilitate a more complete understanding of the present invention, a sequence of assembly and operating characteristics will now be described. The retrieving ratchet 62 and the ratchet bolt and rear bearing 88 are inserted to the central opening in hub 64 of the brake drum ratchet 64. The retrieving pawl 62 is then in an operative position with respect to the teeth of the retrieving ratchet 62. The first and second brake pads 72, 74 are then consecutively placed around the hub 64 and the first brake spring plate and brake post unit likewise dropped into position to encircle the hub 64. This entire unit including the two ratchets, the two brake pads and the spring plate and post assembly are then attached to the first housing end plate 14 by inserting the ratchet bolt and rear bearing 88 through the central opening in the first housing end plate and further, by inserting the brake posts 84 through other appropriately spaced openings therein. The ratchet nuts 90 are then threaded to the ratchet bolt 88 to retain the entire assembly as just described in a fixed relationship with respect to the various parts thereof. It may be seen, particularly from FIG. 3 of the drawings, that the brake drum pawl 64 is fixedly attached to the inner surface of the first housing end plate 14.

The adjustment cap 86 is then assembled with the third brake pad 76 and the second brake spring plate 82, so that the cap may be threaded onto the end of the ratchet bolt and rear bearing 88.

The entire brake assembly 70 as above described is then operatively engaged to the rest of the reel by mating bores 100 in the retrieving ratchet 62 with line spool posts 100. The pillar fastening screws 22 are then threadably inserted through the housing end plate and through the pillars to complete the assembly of the reel.

To use the reel in a fishing operation, the line is run out from the reel while the brake drum ratchet 64 is operating with its pawl 64. Hopefully, the fish will then bite the hook (not shown) at the end of the line and will be allowed to run with the line while further operation of the brake drum ratchet and its pawl 64 takes place. As the hooked fish is running, the brake adjustment cap 86 is turned clockwise selectively by the use of brake adjustment handle 102, with each turn or segment of turn of the brake adjustment handle 102 serving to flatten one or both of the brake spring plates 80, 82, concomitantly providing frictional braking force on the surface of the first, second and third brake pads 72, 74 and 76.

When the fish tires, the crank handle 40 is turned in a clockwise direction to rewind the line on the reel and to retrieve the fish. Appropriate operation of the retrieving ratchet 62 and its pawl 62 takes place during the retrieving process.

Furthermore, considering the environment in which the reel is operative (sand, etc), the structure shown, including imbedding the brake assembly in one housing end plate, serves to protect the brake assembly from dirt and other potential clogging factors. Also, by supplying ratchet bolts of varying thread count with matching caps, with each reel, brake adjustment capability from coarse to fine can be attained. Still further, the material for brake pads 72, 74, 76 can be either nylon, nylon-fluoride, oil impregnated non-metals, or other material. Other useful design features usable in a reel according to the present invention include brake adjustment indicia marks 105 and a single cap having a combination of gross and fine control units.

It is clear from the drawings (FIGS. 3 and 4) that "operation of the ratchet 64" herein refers to counter-clockwise (FIG. 3) rotation of the ratchet gear causing pawl 64 to enter successively the gear teeth of ratchet 64. It then becomes obvious that the pawl 62 (attached to ratchet 64) engages the ratchet 62 when rotation is counterclockwise (FIG. 3). Thus during the time when the line is being run out (a fish is on and pulling it), both ratchets 62, 64 are turning together in the counterclockwise direction, since the pawl for ratchet 62 is fixed to ratchet 64. Such action causes relative motion between ratchet 64 and the brake pads 72, 74. Such relative motion, because of the frictional engagement, produces a brake drag of a magnitude depending upon the amount of axial force urging the brake assembly towards ratchet 64. Such urging is in turn caused by tightening of the brake adjustment handle 102.

On the other hand, clockwise rotation (FIG. 3) causes pawl 64' to stop the rotation of ratchet 64. Thus, in this case, there is no relative rotation between the ratchet 64 and the brake assembly. However, clockwise rotation of ratchet 62 (FIG. 3) is enabled, since the pawl 62', being stationary with respect to ratchet 64, allows rotation of the ratchet 62, or, in other words, "operation" thereof. This is the winding operation.

In accordance with the above description, a novel reel assembly 10 is provided with a reliable and particularly useful control mechanism such that operation and assembly are simple and efficient and yet disassembly for replacement and repair is convenient.

What is claimed is:

1. A fly reel comprising, in combination, a reel housing, a generally cylindrical line spool within and concentric with said housing and defining axial spool ends for winding of a fishing line thereon, a crank, means for rotatably attaching said crank to said reel housing near one spool end, a fully encapsulated and removable brake assembly, means attaching said brake assembly to said spool near the other spool end, said brake assembly including a pair of opposed spring plates spaced by a plurality of brake posts, each of said spring plates being partly deformed out of their respective planes, means defining a brake surface associated with each of said spring plates and reel control means operatively connected to said brake assembly such that operation of said reel control means tends to force the deformed parts of said spring plates into the respective planes of said spring plates and thereby provides increased frictional engagement between said spring plates and said brake surfaces for controlling the rotation of said line spool.

* * * * *